L. TELL.
NUT.
No. 56,124.
Patented July 3, 1866.
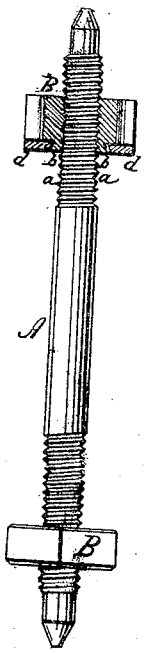
Witnesses;
Inventor;

UNITED STATES PATENT OFFICE.

LEVI TILL, OF SANDUSKY, OHIO.

IMPROVEMENT IN NUTS.

Specification forming part of Letters Patent No. 56,124, dated July 3, 1866.

*To all whom it may concern:*

Be it known that I, LEVI TILL, of Sandusky, in the county of Erie and State of Ohio, have invented new and useful Improvements in Bolt-Nuts; and I do hereby declare that the following is a full, clear, and exact description thereof, which will enable others skilled in the art to make and use the same, reference being had to the accompanying drawing, forming part of this specification.

The present invention consists in forming a raised lip or flange around the opening in a screw-nut, about which and resting upon such face of the nut a washer, made of any of the ordinary materials used for such a purpose, is placed, and then secured thereto so that it can not become disengaged, and thus always in place and upon the nut, by upsetting or sufficiently bending over the said flange in any proper manner to cause it to so bind the washer placed upon the nut that, while it can freely turn, it cannot become detached, the advantages and importance of which are obvious.

In accompanying plate the figure thereof is a side view of a screw-bolt with a nut upon end in section, showing a washer applied to it, according to the present invention, and the bolt turned off so as to allow the nut to be readily screwed thereon.

A in the drawing represents a screw-bolt, made of any of the ordinary materials used therefor, and B a screw-nut screwed upon one end of the same. This nut upon one of its faces, *a*, has a raised lip or flange, *b*, around the opening in the nut for receiving the screw-bolt, and about this lip *b*, upon the same face of the nut, a washer, *d*, is placed, of any desired thickness, but exceeding in a greater or lesser degree the height of the said flange, which flange is then, by means of a punch or any other suitable tool, upset or slightly bent over, so as to bear against and bind the washer to the nut-face, but yet leave it free to turn upon the nut, thereby, as is obvious, so securing the washer to the nut that it cannot become detached therefrom, while at the same time it can act in the same manner and with the same effect as washers simply laid upon the face of the nut over the bolt.

The advantages of securing a washer to a screw-nut in the manner above explained are manifest to all, and therefore need no particular mention herein.

In lieu of forming the raised flange or lip upon the nut-face around its opening through which the screw-bolt passes, it may be formed around the outer edge of the nut-face, and then upset upon the washer; but I do not deem it as desirable or advantageous as the manner above explained.

In order to facilitate the screwing of a nut upon a bolt, and to prevent injury to either of their screw-threads, I turn off the end of the bolt over which the nut is to be placed, as seen at *y* in the drawing, sufficiently to enable the nut to be centered before striking the screw-thread of the bolt, thus attaining the desired results, as is obvious without further explanation.

I claim as new and desire to secure by Letters Patent—

So securing a washer to a screw or other nut that while it can freely turn on the face of the nut it cannot become disengaged therefrom, substantially in the manner described.

LEVI TILL.

Witnesses:
H. C. BUSH,
JOHN MACKEY.